(12) United States Patent
Chen et al.

(10) Patent No.: US 7,170,211 B2
(45) Date of Patent: Jan. 30, 2007

(54) STATOR WINDING HAVING TRANSITIONS

(75) Inventors: Hanyang Ben Chen, Ypsilanti, MI (US); Kirk E. Neet, Saline, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 264 days.

(21) Appl. No.: 10/914,374

(22) Filed: Aug. 9, 2004

(65) Prior Publication Data

US 2005/0046297 A1 Mar. 3, 2005

Related U.S. Application Data

(63) Continuation-in-part of application No. 10/850,012, filed on May 19, 2004, now Pat. No. 7,129,612, which is a continuation-in-part of application No. 10/443,441, filed on May 22, 2003, now Pat. No. 6,882,077, and a continuation of application No. 10/265,529, filed on Oct. 7, 2002, now Pat. No. 6,759,779, which is a continuation-in-part of application No. 10/056,890, filed on Jan. 24, 2002, now Pat. No. 6,750,581.

(60) Provisional application No. 60/454,996, filed on Mar. 14, 2003.

(51) Int. Cl.
*H02K 17/00* (2006.01)

(52) U.S. Cl. ........................ 310/207; 310/184

(58) Field of Classification Search ............ 310/179, 310/184, 198, 201–208
See application file for complete search history.

(56) References Cited

U.S. PATENT DOCUMENTS

| | | |
|---|---|---|
| 2,781,465 A | 2/1957 | Schuff |
| 3,122,667 A | 2/1964 | Baciu |
| 3,444,407 A | 5/1969 | Yates |
| 3,566,171 A | 2/1971 | Tichy et al. |
| 3,634,708 A | 1/1972 | Fisher et al. |
| 3,660,705 A | 5/1972 | Willyoung |
| 3,753,060 A | 8/1973 | Greenwell |
| 3,753,062 A | 8/1973 | Greenwell |

(Continued)

FOREIGN PATENT DOCUMENTS

EP          1 134 872         9/2001

(Continued)

*Primary Examiner*—Dang Le
(74) *Attorney, Agent, or Firm*—Brinks Hofer Gilson & Lione

(57) ABSTRACT

A stator for an electric machine includes a generally cylindrically-shaped stator core having a plurality of circumferentially spaced core slots. A stator winding includes a plurality of phases, each including at least a first filar and a second filar extending circumferentially around the stator core to form a plurality of layers. Each of the filars is a conductor having a plurality of slot segments disposed in the core slots. The slot segments are alternately connected at the first and second ends of the stator core by a plurality of end loop segments that may form a cascaded winding pattern. The plurality of filars of each phase alternating radial positions with one another within at least one end loop segment at discreet locations around the stator core such that the average radial position of the slot segments of the first filar conductors is substantially equal to that of the second filar.

32 Claims, 9 Drawing Sheets

U.S. PATENT DOCUMENTS

| | | |
|---|---|---|
| 3,780,324 A | 12/1973 | Greenwell |
| 3,821,846 A | 7/1974 | Pleis, Jr. et al. |
| 3,838,322 A | 9/1974 | Greenwell |
| 3,854,077 A | 12/1974 | Greenwell |
| 3,884,385 A | 5/1975 | Schaefer |
| 3,990,029 A | 11/1976 | Kano et al. |
| 4,115,915 A | 9/1978 | Godfrey |
| 4,176,444 A | 12/1979 | Walker |
| 4,197,475 A | 4/1980 | Ban et al. |
| 4,206,621 A | 6/1980 | Kawasaki et al. |
| 4,451,749 A | 5/1984 | Kanayama et al. |
| 4,617,725 A | 10/1986 | Holter et al. |
| 4,757,601 A | 7/1988 | Leech et al. |
| 4,808,868 A | 2/1989 | Roberts |
| 4,829,206 A | 5/1989 | Honshima et al. |
| 4,896,063 A | 1/1990 | Roberts |
| 4,959,573 A | 9/1990 | Roberts |
| 5,231,324 A | 7/1993 | Kawamura et al. |
| 5,343,105 A | 8/1994 | Sakabe et al. |
| 5,444,321 A | 8/1995 | Honda et al. |
| 5,449,962 A | 9/1995 | Shichijyo et al. |
| 5,519,266 A | 5/1996 | Chitayat |
| 5,539,265 A | 7/1996 | Harris et al. |
| 5,708,316 A | 1/1998 | Ishida |
| 5,714,824 A | 2/1998 | Couture et al. |
| 5,864,193 A | 1/1999 | Katoh |
| 5,994,813 A | 11/1999 | Umeda et al. |
| 5,998,903 A | 12/1999 | Umeda et al. |
| 6,011,332 A | 1/2000 | Umeda et al. |
| 6,037,695 A | 3/2000 | Kanazawa et al. |
| 6,049,154 A | 4/2000 | Asao et al. |
| 6,051,906 A | 4/2000 | Umeda et al. |
| 6,059,969 A | 5/2000 | Mizutani |
| 6,078,116 A | 6/2000 | Shiga et al. |
| 6,091,169 A | 7/2000 | Umeda et al. |
| 6,097,130 A | 8/2000 | Umeda et al. |
| 6,124,660 A | 9/2000 | Umeda et al. |
| 6,137,201 A | 10/2000 | Umeda et al. |
| 6,137,202 A | 10/2000 | Holmes et al. |
| 6,147,430 A | 11/2000 | Kusase et al. |
| 6,147,432 A | 11/2000 | Kusase et al. |
| 6,166,461 A | 12/2000 | Kusase et al. |
| 6,177,747 B1 | 1/2001 | Maeda et al. |
| 6,181,043 B1 | 1/2001 | Kusase et al. |
| 6,181,045 B1 | 1/2001 | Umeda et al. |
| 6,201,332 B1 | 3/2001 | Umeda et al. |
| 6,204,586 B1 | 3/2001 | Umeda et al. |
| 6,208,060 B1 | 3/2001 | Kusase et al. |
| 6,211,594 B1 | 4/2001 | Umeda et al. |
| 6,222,295 B1 | 4/2001 | Umeda et al. |
| 6,242,835 B1 | 6/2001 | Uemura et al. |
| 6,242,836 B1 | 6/2001 | Ishida et al. |
| 6,285,105 B1 | 9/2001 | Asao et al. |
| 6,291,918 B1 | 9/2001 | Umeda et al. |
| 6,333,573 B1 | 12/2001 | Nakamura |
| 6,335,583 B1 | 1/2002 | Kusase et al. |
| 6,337,530 B1 | 1/2002 | Nakamura et al. |
| 6,348,750 B1 | 2/2002 | Taji et al. |
| 6,373,164 B1 | 4/2002 | Nishimura |
| 6,407,476 B1 | 6/2002 | Nishimura |
| 6,484,388 B1 | 11/2002 | Amlec et al. |
| 6,501,204 B1 | 12/2002 | Oohashi et al. |
| 6,501,205 B1 | 12/2002 | Asao et al. |
| 6,504,283 B1 | 1/2003 | Asao et al. |
| 6,515,393 B2 * | 2/2003 | Asao et al. .................. 310/184 |
| 6,552,463 B2 | 4/2003 | Oohashi et al. |
| 6,570,289 B1 | 5/2003 | Liang et al. |
| 6,573,622 B2 | 6/2003 | Lim et al. |
| 6,664,703 B2 | 12/2003 | Oketani et al. |
| 6,742,238 B2 | 6/2004 | Lee |
| 2001/0011852 A1 | 8/2001 | Nakamura et al. |
| 2001/0019234 A1 | 9/2001 | Murakami et al. |
| 2001/0020807 A1 | 9/2001 | Imori et al. |
| 2001/0024071 A1 | 9/2001 | Yoshida et al. |
| 2001/0026109 A1 | 10/2001 | Higashino et al. |
| 2001/0030487 A1 | 10/2001 | Higashino et al. |
| 2001/0040415 A1 | 11/2001 | Asao et al. |
| 2001/0040416 A1 | 11/2001 | Nakamura et al. |
| 2001/0040418 A1 | 11/2001 | Higashino et al. |
| 2002/0033646 A1 | 3/2002 | Tanaka et al. |
| 2002/0125784 A1 | 9/2002 | Bramson et al. |
| 2003/0132680 A1 | 7/2003 | Nakamura et al. |
| 2003/0137204 A1 | 7/2003 | Neet |
| 2003/0137205 A1 | 7/2003 | Neet |
| 2003/0137207 A1 | 7/2003 | Tamura et al. |
| 2003/0173860 A1 | 9/2003 | Even |
| 2003/0193253 A1 | 10/2003 | Arimitsu et al. |
| 2004/0145267 A1 | 7/2004 | Lowry et al. |

FOREIGN PATENT DOCUMENTS

| | | |
|---|---|---|
| EP | 1 109 289 | 4/2002 |
| JP | 55 120114 | 9/1980 |
| JP | 56 83911 | 7/1981 |
| JP | 57-206244 A | 12/1982 |
| JP | 58 192447 | 11/1983 |
| JP | 61-189155 | 8/1986 |
| JP | 3-107342 A | 5/1991 |
| JP | 11-178264 | 7/1999 |

\* cited by examiner

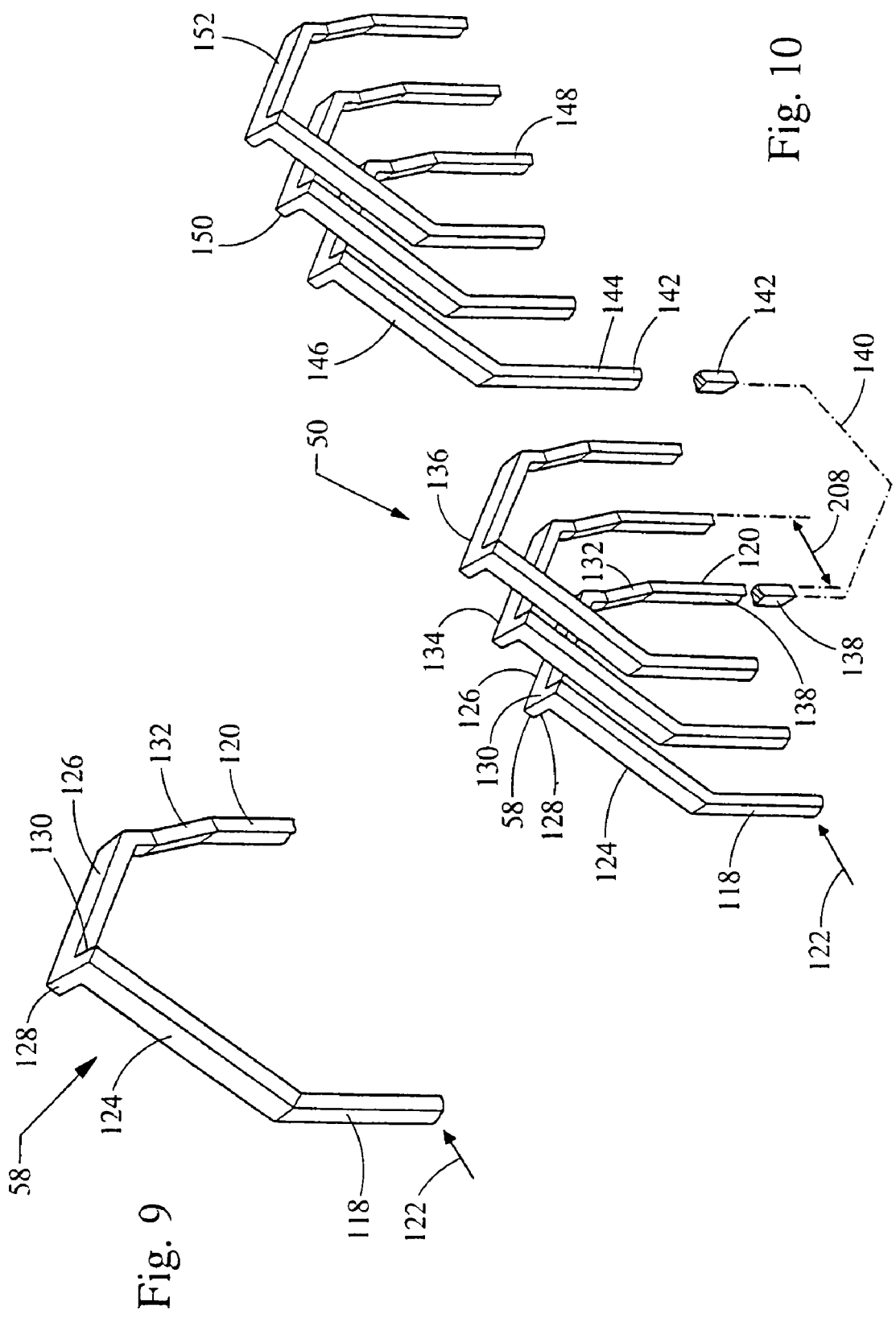

STATOR WINDING HAVING TRANSITIONS

CROSS-REFERENCE TO RELATED APPLICATIONS

This application is a continuation-in-part of U.S. application Ser. No. 10/850,012, filed May 19, 2004 now U.S. Pat. No. 7,129,612 entitled "Stator Assembly With Cascaded Winding and Method of Making Same", which is, in turn, a continuation-in-part of U.S. application Ser. No. 10/443,441, now U.S. Pat. No. 6,882,077 filed May 22, 2003, which claims priority from Provisional Application No. 60/454,996, filed Mar. 14, 2003, the respective disclosures of each of which are hereby incorporated by reference. This application is also a continuation-in-part of U.S. application Ser. No. 10/265,529 filed Oct. 7, 2002, now U.S. Pat. No. 6,759,779 which, in turn, is a continuation-in-part of U.S. application Ser. No. 10/056,890 filed Jan. 24, 2002, now U.S. Pat. No. 6,750,581 the respective disclosures of each of which are hereby incorporated by reference.

BACKGROUND OF THE INVENTION

The present invention relates generally to electric machines and, in particular, to a stator winding for an electric machine having cascaded end loops. Electric machines, such as alternating current electric generators, or alternators are well known. Prior art alternators typically include a stator assembly and a rotor assembly disposed in an alternator housing. The stator assembly is mounted to the housing and includes a generally cylindrically-shaped stator core having a plurality of slots formed therein. The rotor assembly includes a motor rotor attached to a generally cylindrical shaft that is rotatably mounted in the housing and is coaxial with the stator assembly. The stator assembly includes a plurality of wires wound thereon, forming windings. The stator windings are formed of slot segments that are located in the slots and end loop segments that connect two adjacent slot segments of each phase and are formed in a predetermined multi-phase (e.g. three or six) winding pattern in the slots of the stator core. The rotor assembly can be any type of rotor assembly, such as a "claw-pole" rotor assembly, which typically includes opposed poles as part of claw fingers that are positioned around an electrically charged rotor coil. The rotor coil produces a magnetic field in the claw fingers. As a prime mover, such as a steam turbine, a gas turbine, or a drive belt from an automotive internal combustion engine, rotates the rotor assembly, the magnetic field of the rotor assembly passes through the stator windings, inducing an alternating electrical current in the stator windings in a well known manner. The alternating electrical current is then routed from the alternator to a distribution system for consumption by electrical devices or, in the case of an automotive alternator, to a rectifier and then to a charging system for an automobile battery.

One type of device is a high slot fill stator, which is characterized by rectangular shaped conductors that are aligned in one radial row in each slot and that fit closely to the width of the rectangular shaped core slots. High slot fill stators are advantageous because they are efficient and help produce more electrical power per winding than other types of prior art stators. These stators, however, are disadvantageous because the windings are typically interlaced, in which the wires are required to alternate outer and inner radial portions of each slot. This is because one end loop connects the slot segment housed in an outer radial depth of the first slot to a slot segment housed in an inner radial depth of the second slot. This conductor leaves a void in the outer radial depth of the second slot, therefore a second conductor must connect the slot segment housed in an outer radial depth of the second slot to a slot segment housed in an inner radial depth of the third slot. These interlaced windings require an interlacing process to interlace the conductors of all the phases prior to inserting the winding into the core or a connection process to connect the individual U-shaped conductors and therefore disadvantageously increase the complexity of placing the winding the stator.

In a bi-filar winding stator each phase turn includes two wires or filars which are connected in parallel. The wire cross section of each filar in a bi-filar design is half of that in a single-filar design. Therefore, wires in bi-filar designs are much more structurally flexible for bending and turning at stator winding end turns. However, bi-filar windings are subject to overheating due to cross current circulation between filars. Cross current circulation can occur when the two filars are linked by a different amount of flux and therefore have different generated voltages. This can occur if the slot segments of the first filar have a different average radial position in the core slots than the slot segments of the second filar and a phenomenon known as magnetic flux slot leakage, is present. The "normal" path of the magnetic flux is to encircle completely around a core slot by traveling radial outward down one tooth, circumferentially across the yoke and finally radially inward down another tooth. This path for the magnetic flux encircles and therefore links all of the slot segments located in the encircled core slot. However, some amount of the magnetic flux short circuits this path by prematurely crossing the slot before it reaches the yoke—this portion of the magnetic flux is known as slot leakage flux. This slot leakage flux only encircles, and therefore links, slot segments that are located radially inward of the radial position where it pre-maturely crosses the slot. Therefore, slot leakage flux can cause filars with different average radial positions in a slot to have different generated voltages and therefore cross current circulation. This overheating and cross current circulation reduces the efficiency of the alternator. One method developed to reduce the amount of cross-current circulation is to alternate radial positions between the first and second filars at each end loop. This technique however is complicated and expensive to manufacture.

It is desirable, therefore, to provide a stator that utilizes a bi-filar design while reducing the amount of cross current circulation between filars.

SUMMARY OF THE INVENTION

A stator for a dynamoelectric machine according to the present invention includes a generally cylindrically-shaped stator core having a plurality of circumferentially spaced and axially-extending core slots in a surface thereof. The core slots extend between a first and a second end of the stator core. The stator also includes a multi-phase stator winding, wherein each phase includes a first filar and a second filar extending circumferentially around the stator core to form a plurality of layers. Each layer is defined as the radial location from the central axis of the stator core defined by the slot segments disposed in the core slots. For example, the outermost layer is defined as the radial location, which includes the radial location of the outermost slot segments.

Each of the filars is a conductor having a plurality of slot segments disposed in the core slots and may be formed of a single continuous conductor. The term single continuous conductor, utilized herein, is defined as a conductor formed without any connections. The slot segments alternately connected at said first and second ends of said stator core by a plurality of end loop segments. Each of the slot segments of a particular layer is at substantially the same radial distance from a central axis of the stator core and the end loop segments forming a cascaded winding pattern.

The first and second filars of a particular phase each have an average radial position within the stator core slots. The first and second filars of each phase are staggered throughout the layers such that a distance between the average radial position of the slot segments of the first filar and the average radial position of the slot segments of the second filar is minimized.

The cascaded winding pattern advantageously does not require the complex interlaced winding process or the hairpin conductors of the prior art. A portion of the stator winding is cascaded and not interlaced because a series of consecutive slot segments of each layer are located at the substantial same radial distance from the central axis of the stator core and, therefore, do not alternate rearward and forward positions in the slot with other conductors. In addition, a portion of the stator winding is cascaded and not interlaced because the end loops or end loop segments are formed such that the portion of the conductors including the series of consecutive slot segments located at the same radial distance form the central axis are radially aligned for each layer, i.e. for a particular layer, the portion of the first conductor having slot segments disposed in a first set of core slots can be radially inserted into the core slots, prior to the portion of the second conductor having slot segments disposed in a second set of core slots, which can be radially inserted prior to the portion of the third conductor having slot segments disposed in a third set of core slots and so forth. Finally, a portion of the stator winding is cascaded and not interlaced because the end loops or end loop segments are formed such that the layers are radially aligned—i.e the portion of the outermost layer including all of the phases can be radially inserted into the core slots, prior to the portion of the second outermost layer including all of the phases, which can be radially inserted prior to the portion of the third outermost layer including all of the phases and so forth. The term consecutive slot segments, utilized herein, refers to slot segments of one filar that are disposed in adjacent stator core slots belonging to a particular phase—i.e., the slot segments that attach to end portions 167 and 165 are considered consecutive.

Also, the staggered pattern of the first and second filars of each phase reduces the amount of cross current circulation between the first and second filars. This reduces the amount of heat generation within the stator, thereby making the stator more efficient.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 9 is a perspective view of an end loop segment of a portion of a stator winding in accordance with the present invention;

FIG. 10 is a perspective view of a layer of end loop segments of a portion of a stator winding in accordance with the present invention including the end loop segment of FIG. 9;

DESCRIPTION OF THE EMBODIMENTS

Figure 1:
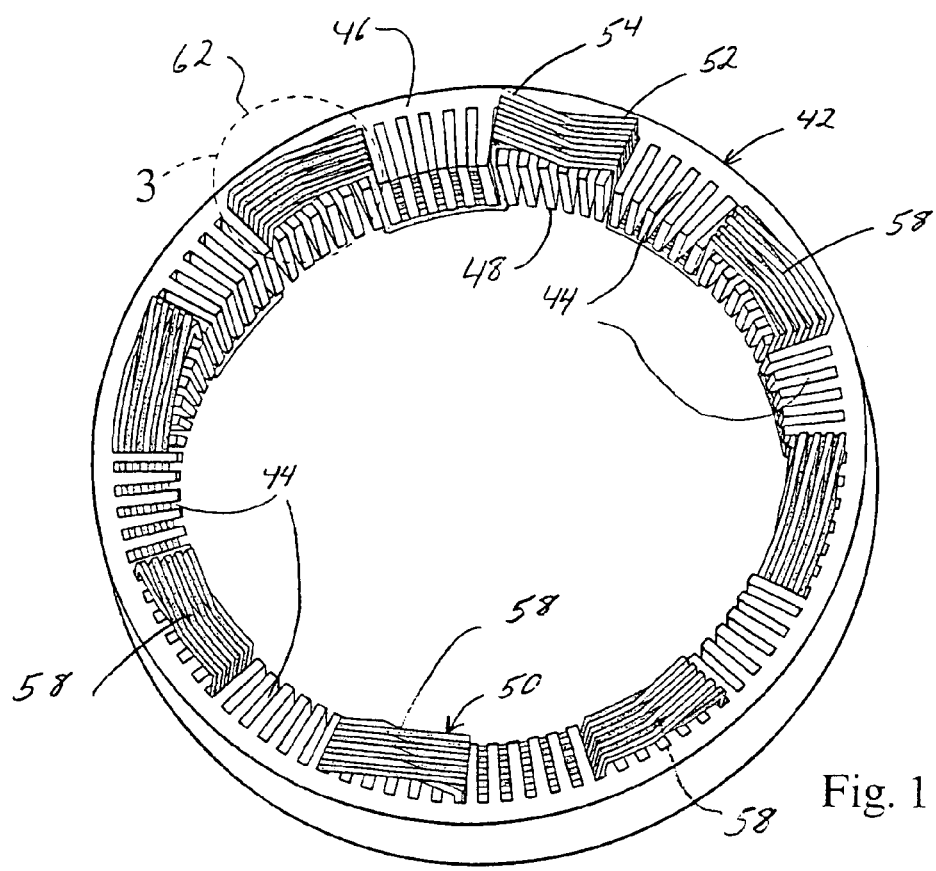
FIG. 1 is a perspective view of a stator core in accordance with the present invention including a single phase of the winding.
Figure 2:
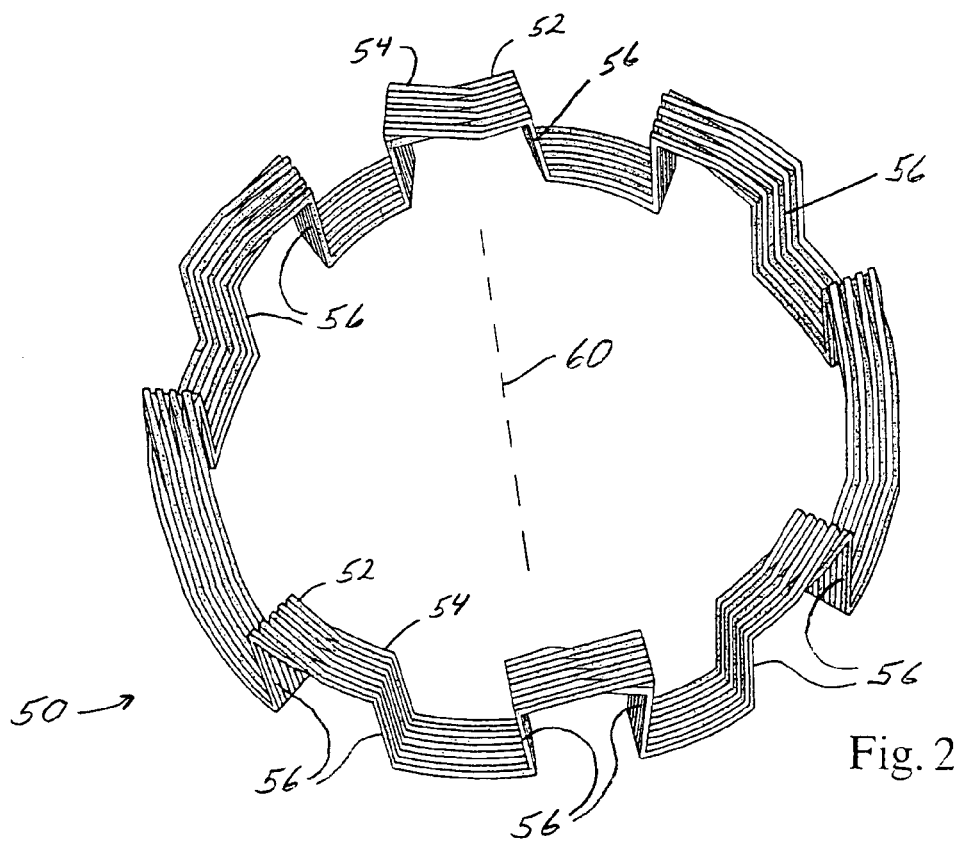
FIG. 2 is a perspective view of the winding from FIG. 1.
Figure 3:
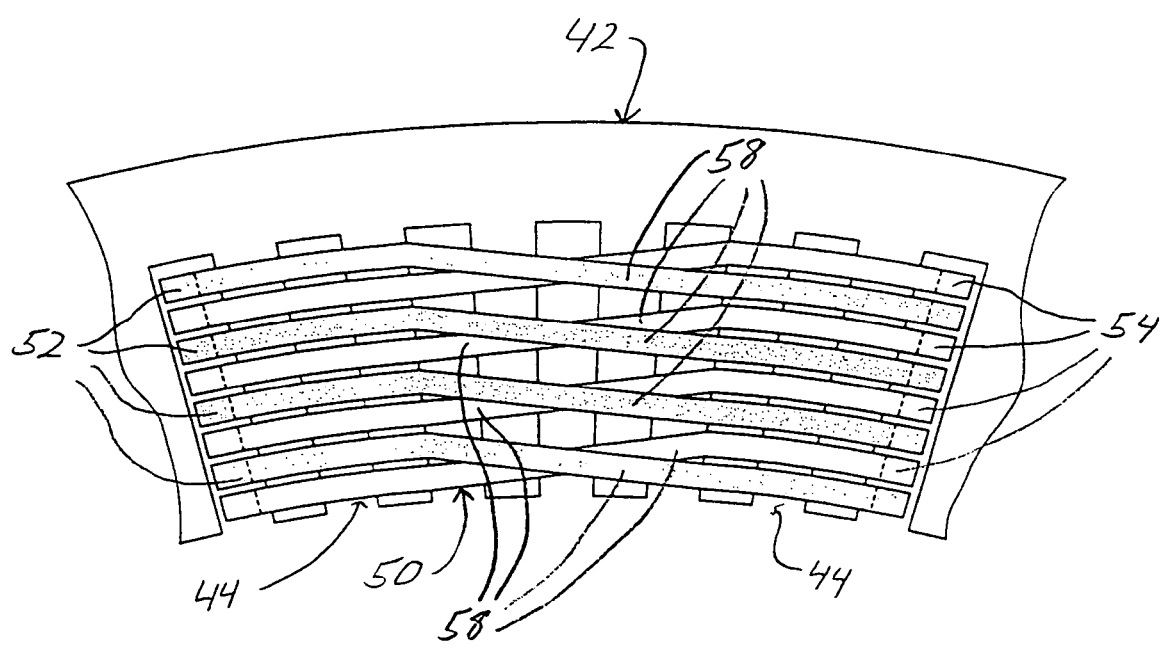
FIG. 3 is an enlarged view of a portion of FIG. 1 as indicated by the circle labeled "FIG. 3" in FIG. 1.
Figure 11A:
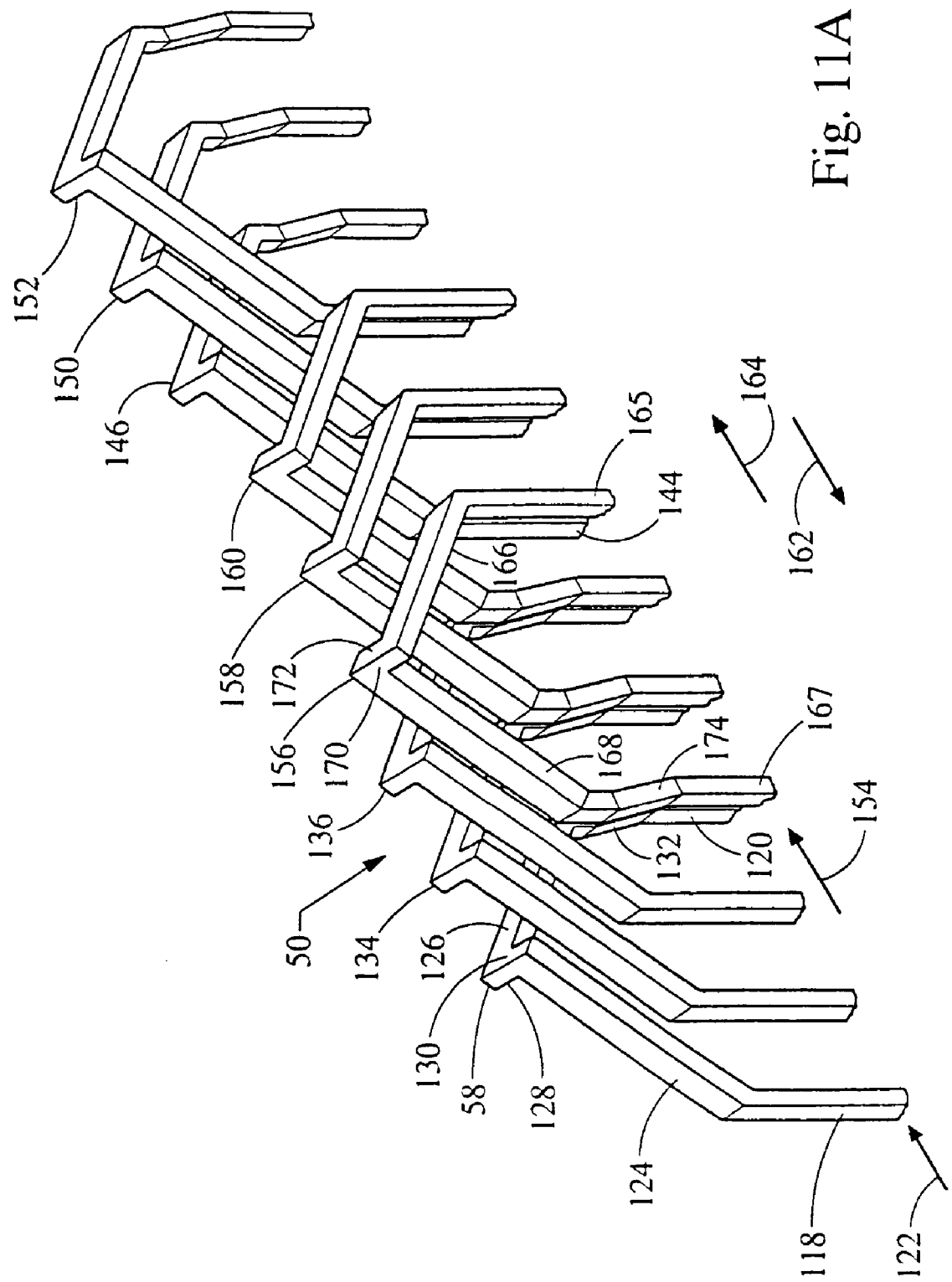
FIG. 11a is a perspective view of a plurality of layers of end loop segments of a stator winding in accordance with the present invention including the layer of FIG. 10.
Figure 11B:
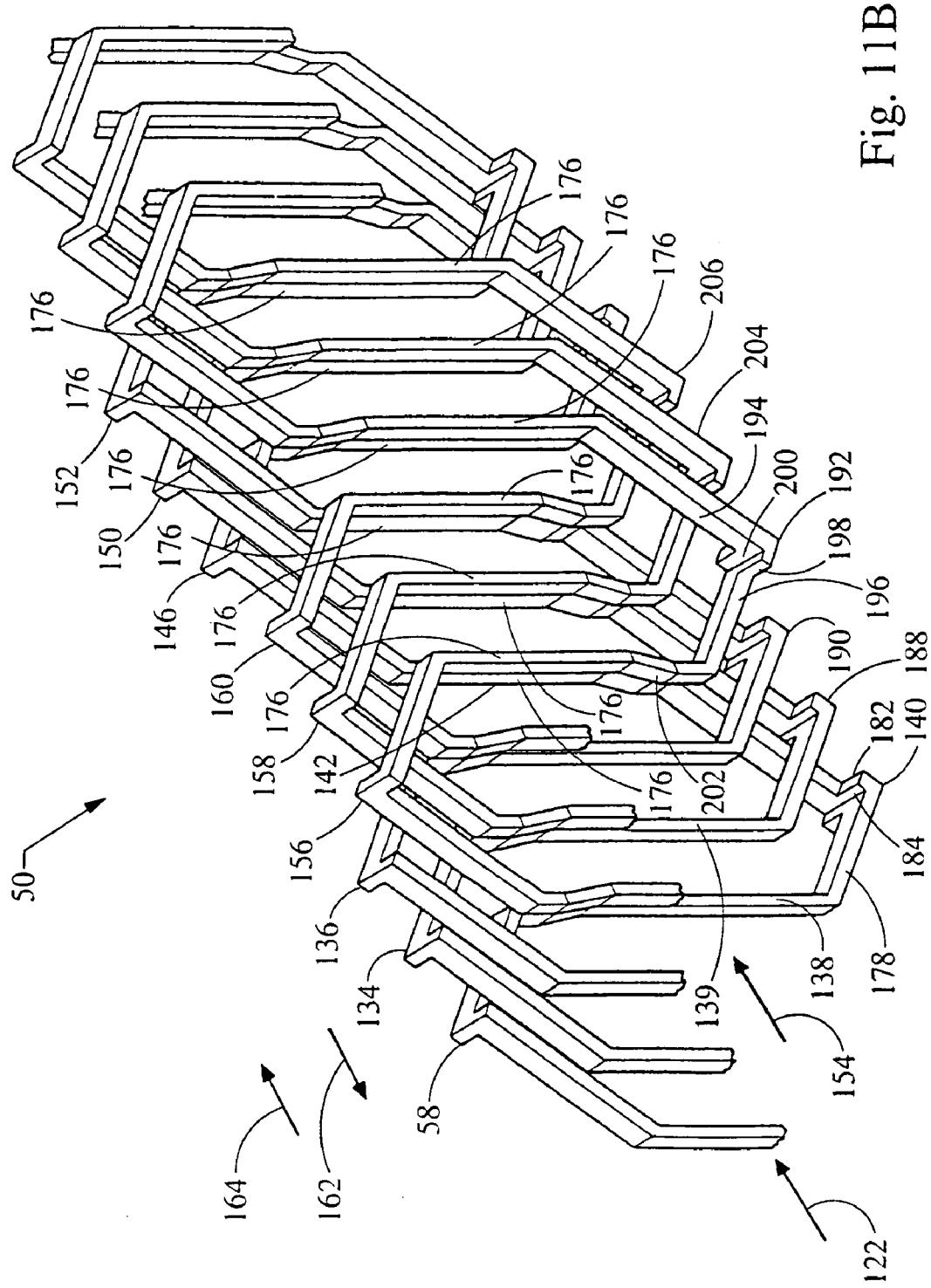
FIG. 11b is a perspective view of a plurality of layers of end loop segments of the stator winding shown in FIG. 11a including a plurality of slot segments and end loop segments in accordance with the present invention.

Referring now to FIGS. 1–3, a stator of the present invention is shown generally at 40. For simplicity, FIGS. 1–5 depict only one phase of a six phase winding and do not show necessary shape of the end loop segments that allow nesting of the end loop segments of all the phases, such as the cascade winding shown in FIGS. 9, 10, 11a and 11b. Although the filars of one phase are shown in FIGS. 1–5 as having the same phase angle, they may also be shifted with respect to each other such that they are out of phase by 180 electrical degrees as can be seen in FIGS. 11a and 11b. The stator 40 includes a generally cylindrically-shaped stator core 42 having a plurality of circumferentially spaced and axially-extending core slots 44. The core slots 14 define a plurality of teeth 15 there between, which are connected to one another by a yoke 19. The core slots 44 extend between a first end 46 of the stator core 42 and a second end 48 of the stator core 42. The stator core 42 includes a stator winding 50 having a plurality of phases. Each phase of the stator winding 50 comprises a first filar 52 and a second filar 54. The first and second filars 52, 54 extend around the stator core 42 circumferentially to form a plurality of layers. FIG. 1 shows a stator core 42 with one phase of a winding 50 included therein. FIG. 2 shows the winding 50 removed from the stator core 42. The first filar 52 and the second filar 54 are wound onto the stator core 42.

Each of the first and second filars 52, 54 is a conductor having a plurality of slot segments 56 disposed in the core slots 44. The slot segments 56 are alternately connected at the first and second ends 46, 48 of the stator core 42 by a plurality of end loop segments 58. Each of the slot segments 56 of a particular layer are the same radial distance from a central axis 60 of the stator core 42 and the end loop segments 58 form a cascaded winding pattern. The cascaded winding pattern is described in more detail in U.S. patent application Ser. No. 10/443,441 which was filed on May 22, 2003 and is hereby incorporated by reference into this application.

To reduce the amount of cross current circulation between the first and second filars 52, 54 the first and second filars 52, 54 of each phase alternate radial positions with one another within at least one of the end loop segments 58 of the stator 40 at discreet locations around the stator core 42. The term discreet location, utilized herein, refers to the circumferential location defined by an end loop segment on either end of the stator core 42—i.e., the end loop segments 156 and 140 of FIG. 11b are located at the same discreet location even though they are located on different ends of the stator core 42. Furthermore, the term, discreet location, as defined does not include the radial location—i.e. in FIG. 4, the filars 52 and 54 alternate radial positions at only two discreet locations even though the filars alternate four times in each discreet location.

In one embodiment, shown in FIGS. 1, 2, and 3, the first and second filars 52, 54 of each phase form a transition 62 and alternate radial positions with one another within every end loop segment 58 at the first end 46 of the stator core 42. In this embodiment, the first and second filars 52, 54 only alternate radial positions at one end of the stator core 42. This reduces the number of transitions 62 and makes manufacturing of the winding 50 easier and less expensive and less time consuming. The winding 50 shown in FIGS. 1, 2, 4 and 5 is known as having a wave winding configuration. A wave winding configuration is defined as a winding including a filar or filars, such as 52, 54, which extend in only one direction, either clockwise or counter-clockwise, for each substantial revolution around the circumference of the stator core 42. The term substantial revolution is defined as being at least 75% of one revolution.

Figure 4:
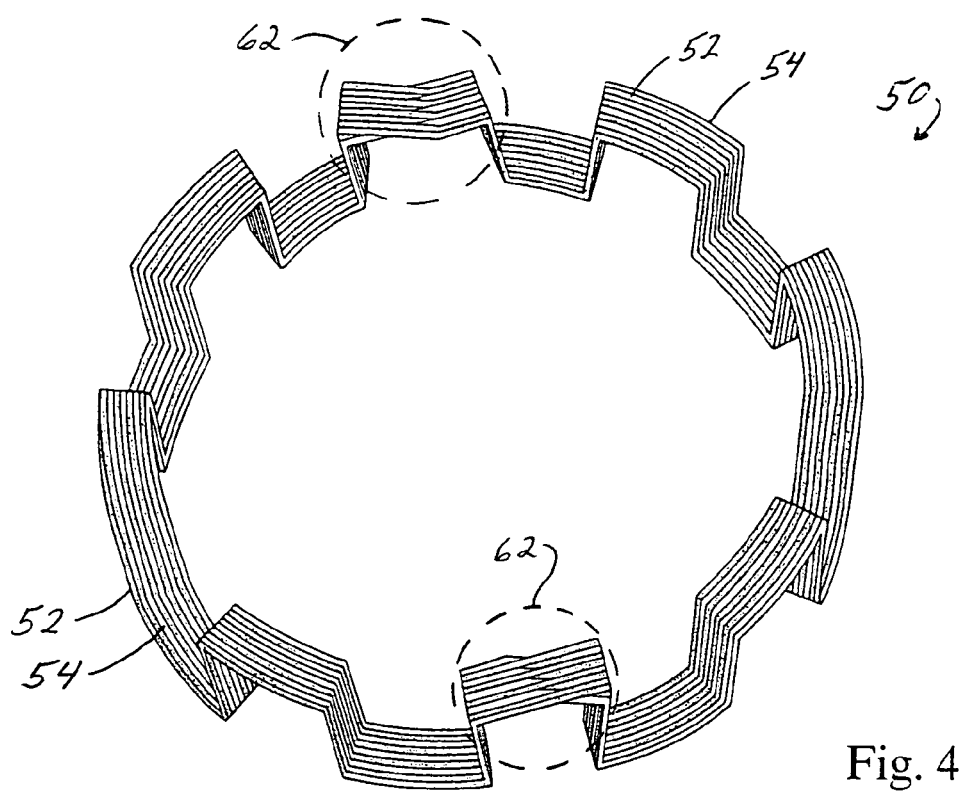
FIGS. 4 and 5 are views similar to FIG. 2 of alternative embodiments of the winding of the present invention.

Alternatively, as shown in FIG. 4, the first and second filars 52, 54 form transitions 62 and alternate radial positions at two discreet locations. Once again, the alternating of radial positions only takes place at one end of the stator core 42, but in this alternative embodiment, the first and second filars 52, 54 only form two transitions 62. As shown, the two transitions 62 may be located on opposite sides of the stator core 42, one-hundred and eighty degrees apart.

Figure 5:
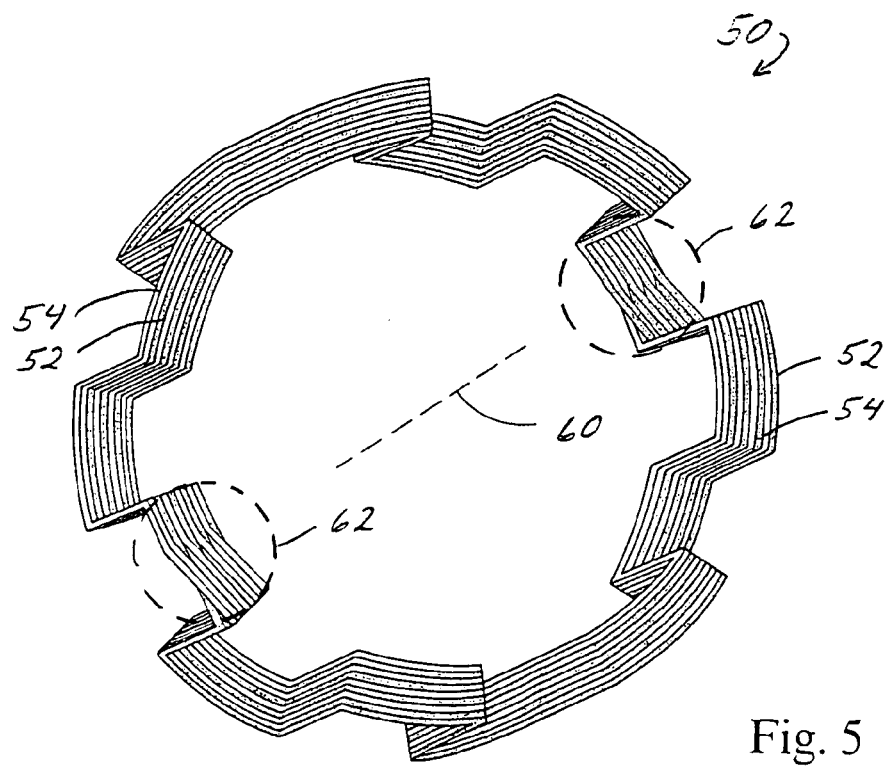

Referring to FIG. 5, in another embodiment, the first and second filars form transitions 62 as discreet locations around the stator core 42, but there is at least one transition 62 formed at each end of the stator core 42. As shown in FIG. 5, there is a transition 62 formed within one of the end loop segments 58 at the first end 46 of the stator core 42, and a transition 62 formed within one of the end loop segments 58 at the second end 48 of the stator core 42. As shown in FIG. 5, the two transitions 62 may be formed on opposite sides of the stator core 42, one-hundred and eighty degrees apart.

As previously mentioned, FIGS. 1–5 show the first filar having the same phase angle as the second filar—i.e., at a particular circumferential location, the end loop segment of the first filar is located on the same end of the stator core as the end loop segment of the second filar. Therefore the transitions 62 at a certain discreet location for the first filar happen on the same end 46 or 48, of the stator core 42 for the transitions 62 of the second filar at the same discreet location. However, it may be desirable to shift one of the filars a predetermined number of slots with respect to the first filar such that the second filar is phased 180 electrical degrees from the first filar—i.e., at a particular circumferential location, the end loop segment of the first filar is located on one end of the stator core and the end loop segment of the second filar is located on the other end. This can best be seen as end loop segment 156 and 140 of FIG. 11B. For the case wherein the filars are phased 180 electrical degrees, the transition are formed for the two filars in the same discreet location but on opposite ends of the stator core.

In one embodiment of the present invention, the stator winding 50 includes three filars and any number of odd filars (not shown). For a stator winding 50 having three filars, the filars form transitions 62 and alternate radial positions at the pre-mentioned discreet locations by having the outermost filar and innermost filar alternate radial positions and the middle filar remain the middle filar. For a stator winding 50 having any odd number of filars, the filars form transitions 62 and alternate radial positions at the pre-mentioned discreet locations by having the middle filar remain the middle filar, the outermost filar alternate with the innermost filar, the second outermost filar alternate with the second innermost filar and so forth. A method to make a stator winding having three filars and a certain number of transitions is similar to the method of a stator winding having two filars, described in more detail below, except two filars are flipped 180 degrees similar to the first filar described below.

In another embodiment of the present invention, the stator winding 50 includes four filars or any number of even filars (not shown). For a stator winding 50 having four filars, the filars form transitions 62 and alternate radial positions at the pre-mentioned discreet locations by having the outermost filar alternate with the innermost filar and the second outermost filar alternate with the second innermost filar. For a stator winding 50 having any number of even filars, the filars form transitions 62 and alternate radial positions at the pre-mentioned discreet locations by having the outermost filar alternate with the innermost filar and the second outermost filar alternate with the second innermost filar and so forth. A method to make a stator winding having four filars or any number of even filars and a certain number of transitions, is to insert the filars into the core slots in a sequential order up until the core slot just prior to a desired transition and then insert the filars in a reverse sequential order. This step can be reversed and repeated for any number of desired transitions.

In another embodiment of the present invention, the first filar 52 and the second filar 54 of each phase each include a first end 66 and a second end 68. The first ends 66 of the first and second filars 52, 54 are connected to one another and the second ends 68 of the first and second filars 52, 54 are connected to one another such that the first and second filars 52, 54 of each phase are connected in parallel. The first ends 66 of the first and second filars 52, 54 of each phase are connected to a neutral point and said second ends 68 of said first and second filars 52, 54 of each phase are connected to rectifying diodes.

Figure 6:
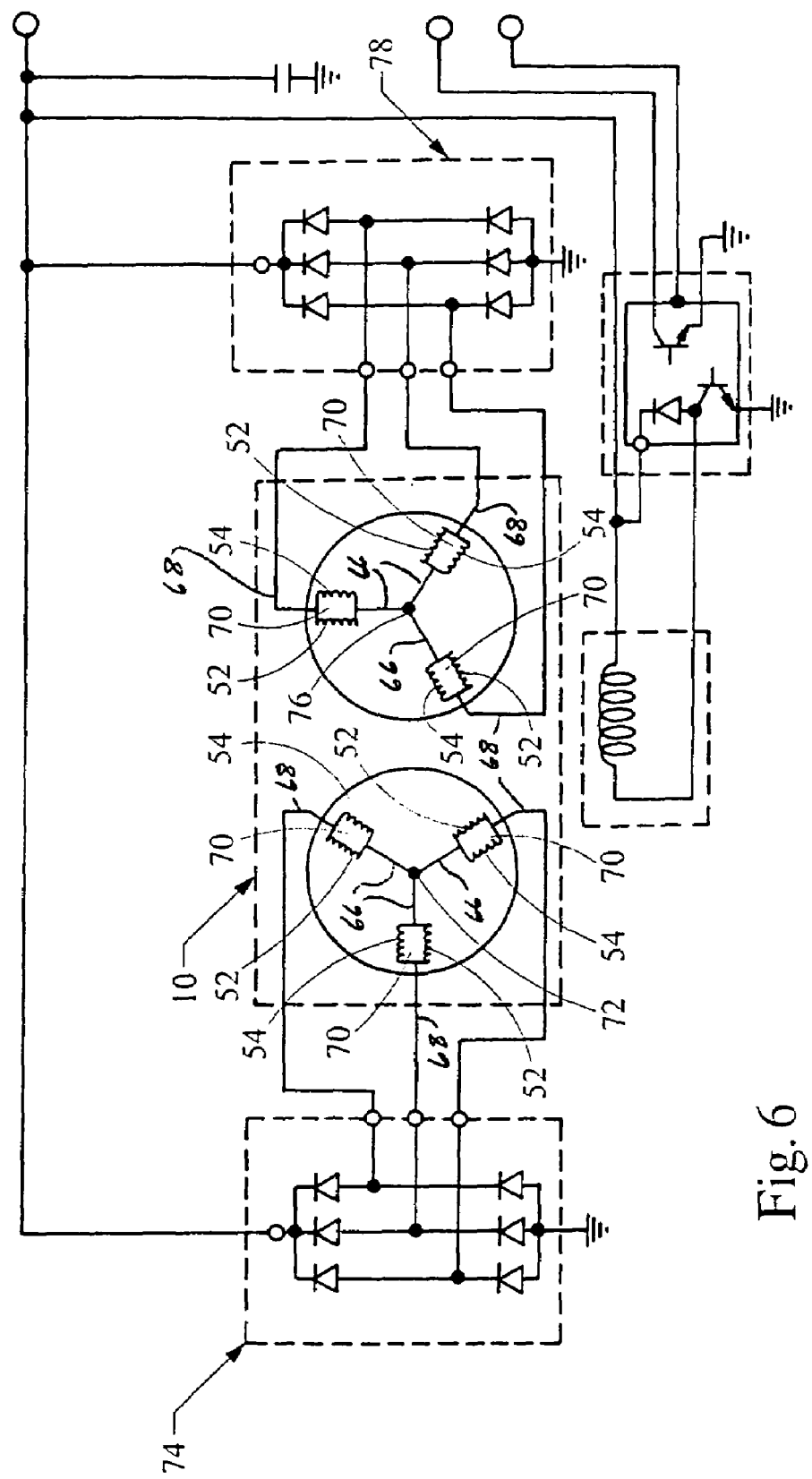
FIG. 6 is a schematic view of an alternator having a stator of the present invention wherein the alternator has two neutral points.

In FIG. 6, the alternator has six phases 70 and two neutral points 72, 76. An alternator having six phases includes end loop segments 58 that connect a slot segment 56 disposed in a first particular core slot 44 with a slot segment 56 disposed in a core slot 44 that is located six core slots 44 from the first particular core slot 44, best seen in FIG. 3. The first ends 66 of the filars 52, 54 of a first half of the phases 70 are connected to a first neutral point 72 and the second ends 68 of the filars 52, 54 of the first half of the phases 70 are connected to a first rectifier such as first rectifying diodes 74. The first ends 66 of the filars 52, 54 of a second half of the phases 70 are connected to a second neutral point 76 and the second ends 68 of the filars 52, 54 of the second half of the phases 70 are connected to a second rectifier such as second rectifying diodes 78.

Figure 7:
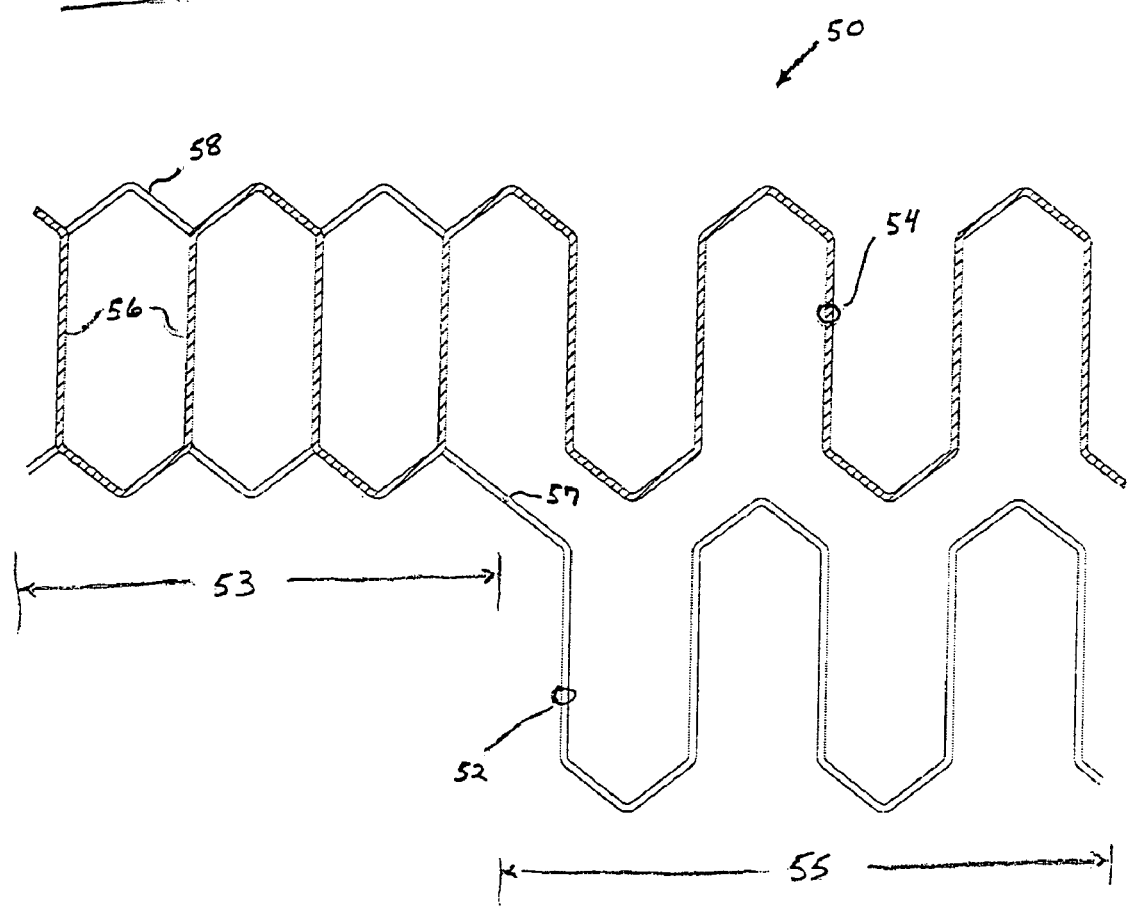
FIG. 7 is a partial view of a method to create one phase of the winding having a transition of the present invention.

Referring now to FIG. 7, a partial view of two layers of the winding 50 is shown having first and second filars 52, 54, each being a conductor having slot segments 56 alternating with end loop segments 58. The second filar 54 is shown hatched in FIG. 7 and FIG. 8. For simplicity, FIGS. 7 and FIG. 8 only show one phase of the winding 50 and do not show a shape of the end loop segments 58 which allow for nesting of the end loop segments 58, such as the cascaded winding described in FIGS. 9, 10, 11*a* and 11*b*. The winding 50 is in a pre-insertion state wherein the winding has not yet been inserted into the core slots and therefore FIG. 7 represents an intermediate step of a method to produce a winding 50 having a transition. The first filar 52 is composed of a section 53 and a section 55 of the winding 50. The section 55 of the winding 50 is rotated 180 degrees, or flipped around the point 57, as shown in FIG. 7. The second filar 54 is then placed on top of the section 53 of the first filar 52. The next step (not shown) is to rotate the section 55 of the first filar 52 180 degrees in the opposite direction such that section 55 of the first filar 52 lies on top of the second filar 54. The winding 50 is then coiled and inserted into the core slots. This method creates one transition as can best be seen as transition 62 in FIG. 4.

Figure 8:
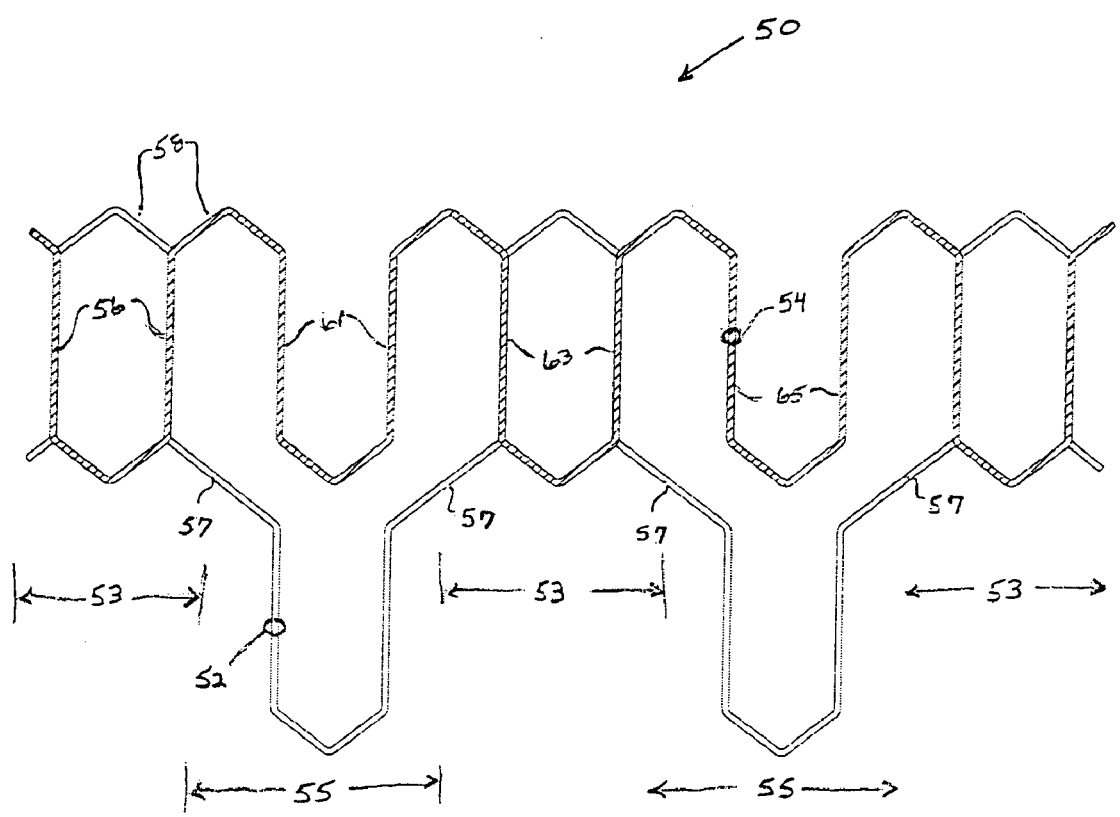
FIG. 8 is a partial view of a method to create one phase of the winding having a plurality of transitions of the present invention.

Referring now to FIG. 8, a partial view of two layers of the winding 50 is shown having first and second filars 52, 54, each being a conductor having slot segments 56 alternating with end loop segments 58. The winding 50 is in a pre-insertion state wherein the winding has not yet been inserted into the core slots and therefore FIG. 8 represents an intermediate step of a method to produce a winding 50 having a plurality of transitions. The first filar 52 is composed of sections 53 and sections 55 of the winding 50. The sections 55 of the winding 50 are rotated 180 degrees, or flipped around the points 57, as shown in FIG. 8. The second filar 54 is then placed on top of the sections 53 of the first filar 52. The next step (not shown) is to rotate the sections 55 of the first filar 52 180 degrees in the opposite direction such that sections 55 of the first filar 52 lie on top of the second filar 54. The winding 50 is then coiled and inserted into the core slots. This method creates winding 50 having a plurality of transitions wherein a filar, such as the second filar 54, has transition end loop segments located only one end of the stator core. Furthermore, this method creates a winding 50 having a filar, such as the second filar 54, having a first set 61 of two consecutive slot segments 56 disposed in a first layer, a second set 63 of two consecutive slot segments 56 disposed in a second layer, and a third set 65 of two consecutive slot segments 56 disposed in the first layer and so forth. Following the second filar 54 form the left end of FIG. 8 to the right end of FIG. 8, one must follow through the first set 61 and then the second set 63 and then the third set 65 and so forth. This is defined as a filar, such as 54, having the second set 63 located in between the first set 61 and the third set 65.

Referring now to FIG. 9, each of the first and second filars 52, 54 is a conductor having a plurality of slot segments 56 disposed in the core slots 44. The slot segments 56 are alternately connected at the first and second ends 46, 48 of the stator core 42 by a plurality of end loop segments 58. Each of the slot segments 56 of a particular layer are substantially the same radial distance from a central axis 60 of the stator core 42 and the end loop segments 58 form a cascaded winding pattern. The end loop segment 58 shown in FIG. 9 is defined as a same layer end loop segment because it connects two slot segments 56 that are disposed substantially in the same layer or substantially at the same radial distance from a central axis 60 of the stator core 42

The end loop segment 58 is adapted to be a part of the stator winding 50 and includes a first substantially straight end portion 118 and a second substantially straight end portion 120 that are each proximate to a respective slot segment, discussed in more detail below, of the stator winding 50. The first end portion 118 and the second end portion 120 of the end loop segment 58 are at a same radial distance from the central axis 60 of the stator core 42. The first end portion 118 and the second end portion 120 form a portion of a layer, indicated generally at 122, of the stator winding 50 whose slot segments are in a same radial distance from the central axis 60 of the stator core 42. Although end portions, such as 118 and 120, are described as entities, they may, in fact, just be portions of the slot segments, discussed in more detail below.

The end loop segment 58 includes a first sloped portion 124 and a second sloped portion 126 that meet at an apex portion 128. The phrase sloped portion, utilized herein, refers to a portion, such as sloped portion 124, of and end loop segment 58 connecting two slot segments 56, which extends in the axial direction as well as extending toward the next slot segment 56 disposed in a core slot 44, for at least 30% of the circumferential distance between the two slot segments 56. The first sloped portion 124 is substantially co-radial with the layer 122, the first end portion 118 and the second end portion 120. The second sloped portion 126 is substantially non-co-radial with the layer 122, the first end portion 118 and the second end portion 120. The second sloped portion 126 is therefore, a portion of the end loop segment 58, which is located at a different radial distance from the central axis of the stator core as any portion of the slot segments 56 which are connected to that same end loop segment 58. The apex portion 128 includes a first radial extension portion 130. The first radial extension portion 130 extends from the first sloped portion 124 in the radially outward direction, which provides a radial outward adjustment for the end loop segment 58. A second radial extension portion 132 connects the second sloped portion 126 and the second end portion 120. The second radial extension portion 132 extends from the second sloped portion 126 in the radially inward direction, which provides a radial inward adjustment for the end loop segment 58.

While the end loop segment 58 has been shown wherein the radial outward adjustment is adjacent the apex portion 128 and the radial inward adjustment is adjacent the second sloped portion 126, those skilled in the art can appreciate that the radial outward and inward adjustments can be on any one or on any two of the first sloped portion 124, the second sloped portion 126, and the apex portion 128 in order to provide the cascaded winding pattern, described in more detail below.

Referring now to FIG. 10, the end loop segment 58 of FIG. 9 is shown adjacent a plurality of substantially identical end loop segments, indicated generally at 134 and 136. The end loop segments 58, 134, and 136 form a portion of the layer 122 of the stator winding 50. The end loop segments 58, 134, and 136 are shown in a three-phase winding pattern but those skilled in the art will appreciate that the end loop segments 58, 134, and 136 may be formed in, for example, a six-phase winding pattern, or any other winding pattern advantageous for producing electricity or for generating torque, as in the case of an electric motor. The end loop segments 58, 134, and 136 are preferably each disposed at the first end 46 of the stator core 42.

The portion 120 attaches to a first slot segment, shown schematically at 138, which extends through a one of the core slots 44 to the second end 48 of the stator core 42. As the first slot segment 138 exits the second end 48, the first slot segment 138 is attached to an end of another end loop segment, shown schematically at 140, which is described in more detail below. The end loop segment 140 is attached at another end to a second slot segment, shown schematically at 142. The second slot segment 142 extends upwardly through another one of the core slots 44 of the stator core 42 and attaches to a portion 144 of an end loop segment 146, which is substantially identical to the end loop segments 58, 134, and 136. Similarly, a portion 148 of the end loop segment 146 connects to another slot segment, discussed in more detail below. The pattern of connecting end loop segments 58, 140, and 146 and slot segments, such as the slot segments 138 and 142, as outlined above, continues throughout one substantial circumference of the stator core 42 to form a first layer, such as the layer 122, of a single phase of the stator winding 50.

The end loop segment 146 is shown adjacent a plurality of substantially identical end loop segments, indicated generally at 150 and 152. The end loop segments 146, 150, and 152 are each connected to a corresponding plurality of slot segments, discussed in more detail below, such as the slot segments 138 and 142, which are each disposed in a respective core slot 44 of the stator core 42. The slot segments are attached to a plurality of end loop segments, discussed in more detail below. The end loop segments 134, 136, 150, and 152, when attached to the slot segments and end loop segments, each form a respective continuous first layer of the complete stator winding 50 that is wound about the circumference of the stator core 42.

Preferably, each of the slot segments 138 and 142 and each of the end loop segment portions 58, 134, 136, 140, 146, 150, and 152 are formed from a rectangular wire and have a cross-sectional shape having a substantially constant circumferential width and radial depth and therefore equal area, however, other shapes could also be employed such as round or square. For those skilled in the art, it is known that typical rectangular or square shaped conductors may include radii on the corners intermediate two adjacent edges.

Referring now to FIGS. 11a and 11b, the first layer 122 of the end loop segments 58, 134, 136, 140, 146, 150, and 152 of FIG. 10, is shown with a second layer of end loop segments indicated generally at 154. The layer 154 is located radially inward of the layer 122 at a predetermined radial distance from the layer 122. The second layer 154 includes a plurality of end loop segments, indicated generally at 156, 158, and 160. The layers 122 and 154 together form a portion of the stator winding, indicated generally at 50. The conductor of the second layer 154 including the end loop 156 is similar to the conductor of the first layer 122 including the end loop 58 except that it is inserted into the core slots 44, shifted by a predetermined number of slots, discussed in more detail below, and it has end loop segments, such as the end loop segment 156, that extend radially outwardly in the counterclockwise direction 162, which is opposite the end loop segments, such as the end loop segment 58, of the first layer 122, which extend radially outwardly in the clockwise direction 164.

The end loop segment 156 includes a first sloped portion 166 and a second sloped portion 168 connected by an apex portion 170. The first sloped portion 166 is substantially co-radial with the second layer 154, the first end portion 165 and the second end portion 167. The second sloped portion 168 is substantially non-co-radial with the second layer 154, the first end portion 165 and the second end portion 167. The apex portion 170 includes a first radial extension portion 172. The first radial extension portion 172 extends from the first sloped portion 166 in the radially outward direction, which provides a radial outward adjustment for the end loop segment 156. A second radial extension portion 174 connects the second sloped portion 168 and the second end portion 167. The second radial extension portion 174 extends from the second sloped portion 168 in the radially inward direction, which provides a radial inward adjustment for the end loop segment 156.

As can best be seen in FIG. 11a, the non-co-radial portion 168 of end loop segment 156 extends radially outward where it becomes substantially co-radial with the first layer 122, the first end portion 118 and the second end portion 120, but because it is shifted by n slots, it does not violate the space of the end loop segments of the first layer 122. This allows the end loop segments of the two layers, 122 and 154 to cascade together forming a two layer winding 50, which extends radially outward by one substantial wire width beyond the first layer 122 but does not extend radially inward beyond the innermost layer 154. In FIG. 11a, layer 122 is defined as the outermost layer and layer 154 is defined as the second outermost layer. Although the radial extension portions, such as 174, appear as sharp bends, it is obvious to those skilled in the art that typical radial extension portions may be more gentle in nature and include radii, not shown.

For a winding with a plurality of layers, a third layer (not shown) which is substantially identical to the first layer 122, would have non-co-radial portions that would extend radially outward and be substantially co-radial with the second layer 154 and therefore cascade with the second layer 154. For a pattern where the radial layers alternate between being substantially identical with the first layer 122 and the second layer 154, a pattern develops where the winding 50 only extends radially outward by one wire width for the outermost layer 122 but not radially inward of the innermost layer. This cascading effect allows a winding 50 with a plurality of layers to be inserted into a stator core 42, that extend radially outwardly by one wire width while not extending radially inwardly. The end loop segments 158 and 160 are substantially identical to the end loop segment 156. The radial outward and inward adjustments for the layers 122, 154 form a cascaded winding pattern shown in FIGS. 11a and 11b.

Referring again to FIGS. 11b, the first layer 122 and the second layer 154 are shown with a plurality of slot segments 176, which are substantially identical to the slot segments 138 and 142. The end loop segment 140 of FIG. 18 is shown having a first sloped portion 178 and a second sloped portion 180 connected by an apex portion 182. The first sloped portion 178 is substantially co-radial with the first layer 122, and the slot segments 138 and 142. The second sloped portion 180 is substantially non-co-radial with the first layer 122, and the slot segments 138 and 142. The apex portion 182 includes a first radial extension portion 184. The first radial extension portion 184 extends from the first sloped portion 178 in the radially outward direction, which provides a radial outward adjustment for the end loop segment 140. A second radial extension portion 186 connects the second sloped portion 180 and the slot segment 142. The second radial extension portion 186 extends from the second sloped portion 180 in the radially inward direction, which provides a radial inward adjustment for the end loop segment 140. The end loop segments 188 and 190 are substantially identical to the end loop segment 140.

Similarly, an end loop segment 192 of the second layer 154 is shown adjacent the end loop segment 190 of the first layer 122. The end loop segment 192 includes a first sloped portion 194 and a second sloped portion 196 connected by an apex portion 198. The first sloped portion 194 is substantially co-radial with the second layer 154, and the slot segments 176 of the second layer 154. The second sloped portion 196 is substantially non-co-radial with the second layer 154, and the slot segments 176. The apex portion 198 includes a first radial extension portion 200. The first radial extension portion 200 extends from the first sloped portion 194 in the radially outward direction, which provides a radial outward adjustment for the end loop segment 192. A second radial extension portion 202 connects the second sloped portion 196 and the slot segment 176. The second radial extension portion 202 extends from the second sloped portion 196 in the radially inward direction, which provides a radial inward adjustment for the end loop segment 192. The end loop segments 204 and 206 are substantially identical to the end loop segment 192.

The slot segments 138, 142, and 176 of each phase of the stator winding 50 are preferably disposed in respective core slots 44 at an equal pitch around the circumference of the stator core 42. Specifically, a slot segment of a phase, such as the slot segment 138, is disposed in a respective core slot 44 adjacent a slot segment 139 of the adjacent phase. The respective slot segments 138 and 139 are spaced apart by a circumferential distance or pitch 208, best seen in FIG. 18. The circumferential pitch 208 is substantially equal to the circumferential distance between a pair of adjacent core slots 44 in the stator core 42. Each of the slot segments and end loop segments of the phase including the slot segment 138 remain disposed adjacent the respective slot segments and end loop segments of the phase including the slot segment 139 at the same circumferential pitch 208 throughout the length of the stator winding 50 and throughout the circumference of the stator core 42.

While the slot segments 176 are shown generally coplanar in FIGS. 11a and 11b for illustrative purposes, the slot segments 176 are preferably adapted to be received by a radially curved surface, such as the interior surface of the stator core 42 and, therefore, are not coplanar but are co-radial. The width of each of the slot segments 176, including any insulation, preferably fits closely to the width of the core slots 44, including any insulation.

The foregoing discussion discloses and describes various embodiments of the invention. One skilled in the art will readily recognize from such discussion, and from the accompanying drawings and claims, that changes and modifications can be made to the invention without departing from the fair scope of the invention as defined in the following claims. The invention has been described in an illustrative manner, and it is to be understood that the terminology which has been used is intended to be in the nature of words of description rather than of limitation.

What is claimed is:

1. A stator for an electric machine, comprising:
    a generally cylindrically-shaped stator core having a plurality of circumferentially spaced and axially-extending core slots in a surface thereof, said core slots extending between a first and a second end of said stator core; a stator winding having a plurality of phases, each phase comprising at least a first filar and a second filar extending circumferentially around said stator core to form a plurality of layers;
    each of said filars being a conductor having a plurality of slot segments disposed in said core slots, said slot segments alternately connected at said first and second ends of said stator core by a plurality of end loop segments,
    said first filar having a first set of a plurality of consecutive slot segments having at least a first and second consecutive slot segment wherein each slot segment is disposed at substantially the same radial distance from a central axis of said stator core and having a second set of a plurality of consecutive slot segments having at least a third and fourth consecutive slot segment wherein each slot segment is disposed at substantially the same radial distance from a central axis of said stator core;
    said plurality of consecutive slot segments of said first set being disposed at substantially the same radial distance from a central axis of said stator core as said plurality of consecutive slot segments of said second set; and
    said slot segments of said first and second filars of a particular phase alternating radial positions with one another within at least one discreet location around said stator core.

2. The stator of claim 1 wherein said first and second filars of a particular phase alternate radial positions with one another within at least one discreet location and said first filar forms transitions within end loop segments located at only one end of said stator core.

3. The stator of claim 2 wherein said first and second filars of a particular phase alternate radial positions with one another and said first filar forms transitions within every end loop segment at only one end of said stator core.

4. The stator of claim 2 wherein said first and second filars of a particular phase alternate radial positions with one another within said end loop segments at only two discreet locations.

5. The stator core of claim 4 wherein said two discreet locations are located substantially 180 degrees apart from one another.

6. The stator of claim 1 wherein said first and second filars of a particular phase alternate radial positions with one another within at least two discreet locations, and said first filar forms transitions at least once at each end of said stator core.

7. The stator of claim 6 wherein said first and second filars of a particular phase alternate radial positions with one another within said end loop segments at only two discreet locations, and said first filar forms transitions at a first discreet location at said first end of said stator core and at a second discreet location at said second end of said stator core.

8. The stator of claim 1 wherein said first filar and said second filar of each phase each include a first end and a second end, said first ends of said first and second filars being connected to one another and said second ends of said first and second filars being connected to one another such that said first and second filars are connected in parallel.

9. The stator of claim 8 wherein said first ends of said filars of a first half of said phases are connected to a first neutral point and said second ends of said filars of said first half of said phases are connected to a rectifier, and said first ends of said filars of a second half of said phases are connected to a second neutral point and said second ends of said filars of said second half of said phases are connected to a rectifier.

10. The stator according to claim 1 wherein said end loop segments of each particular layer include a first sloped portion substantially co-radial with said slot segments of said particular layer and a second sloped portion substantially non-co-radial with said slot segments of said particular layer, said first and second sloped portions connected by an apex portion thereof.

11. The stator according to claim 1 wherein at least one of said end loop segments of the portion of the conductors including a series of consecutive slot segments located at the same radial distance form the central axis includes two radial adjustments to form a cascaded winding pattern.

12. The stator according to claim 1 including at least three layers and wherein at least one of said layers is shifted a predetermined number of slots from at least one of another of said layers.

13. The stator according to claim 12 wherein said end loop segments of a one of said layers extend radially outwardly in a counterclockwise direction on said first end of said stator core and said end loop segments of another one of said layers extend radially outwardly in a clockwise direction on said first end of said stator core.

14. A stator for an electric machine, comprising:
 a generally cylindrically-shaped stator core having a plurality of circumferentially spaced and axially-extending core slots in a surface thereof, said core slots extending between a first and a second end of said stator core; and
 a stator winding having a plurality of phases, each phase comprising at least a first filar extending circumferentially around said stator core to form a plurality of layers;
 said first filar being a conductor having a plurality of slot segments disposed in said core slots, said slot segments alternately connected at said first and second ends of said stator core by a plurality of end loop segments; a plurality of consecutive slot segments of said first filar of a particular one of said phases being disposed substantially in the innermost layer and another plurality of consecutive slot segments of said first filar being disposed substantially in a different layer;
 at least one end loop segment connecting said plurality of consecutive slot segments disposed in said innermost layer having a portion of the end loop segment which is at a different radial distance from the central axis of said stator core as any portion of said slot segments disposed in said innermost layer; and
 at least one end loop segment connecting said plurality of consecutive slot segments disposed in said different layer having a portion of the end loop segment which is at a different radial distance from the central axis of said stator core as any portion of said slot segments disposed in said different layer.

15. The stator according to claim 14 wherein the number of said consecutive slot segments of said first filar which are disposed in said innermost layer is at least three and wherein the number of said consecutive slot segments of said first filar which are disposed in said different layer is at least three.

16. The stator according to claim 14 wherein said consecutive slot segments of said first filar which are disposed in said different layer are disposed in the second innermost layer.

17. The stator according to claim 15 wherein a portion of said first filar including said plurality of consecutive slot segments being disposed in the innermost layer is formed from a single continuous conductor and a portion of said first filar including said consecutive slot segments being disposed in said different layer is formed from a single continuous conductor.

18. The stator according to claim 17 wherein said portion of said first filar including said plurality of consecutive slot segments being disposed in the innermost layer and said portion of said first filar including said plurality of consecutive slot segments being disposed in said different layer are formed from the same single continuous conductor.

19. The stator according to claim 14 wherein a plurality of said end loop segments connect said slot segments disposed in a particular slot with a slot segment disposed in a slot which is located six slots from said particular slot.

20. The stator of claim 14 wherein said phases each include at least three filars and said filars of each phase each include a first end and a second end, said first ends of said filars being connected to one another and said second ends of said filars being connected to one another such that said filars are connected in parallel.

21. A stator for an electric machine, comprising:
 a generally cylindrically-shaped stator core having a plurality of circumferentially spaced and axially-extending core slots in a surface thereof, said core slots extending between a first and a second end of said stator core;
 a stator winding having a wave winding configuration and having a plurality of phases, each phase comprising at least a first filar extending circumferentially around said stator core to form a plurality of layers;
 said first filar being a conductor having a plurality of slot segments disposed in said core slots, said slot segments alternately connected at said first and second ends of said stator core by a plurality of end loop segments;
 said first filar of a particular one of said phases having at least three consecutive slot segments being disposed in a particular layer and at least three consecutive slot segments being disposed in a different particular layer;
 a portion of said first filar including all of said at least three consecutive slot segments being disposed in said particular layer being formed from a single continuous conductor;
 a portion of said first filar including all of said at least three consecutive slot segments being disposed in said different particular layer being formed from a single continuous conductor;
 a plurality of end loop segments connecting a first slot segment disposed in a first particular core slot with a second slot segment disposed in a second particular core slot, wherein each end loop segment is a same layer end loop segment;
 each particular one of said same layer end loop segments connecting said first slot segment disposed in said first particular core slot with said second slot segment disposed in said second particular core slot, includes a portion which is located at a different radial distance from the central axis of said stator core as any portion of said slot segments which are connected to said particular one of said same layer end loop segment.

22. The stator according to claim 21 wherein said second particular core slot is located six slots from said first particular core slot.

23. A stator for an electric machine, comprising:
 a generally cylindrically-shaped stator core having a plurality of circumferentially spaced and axially-extending core slots in a surface thereof, said core slots extending between a first and a second end of said stator core; a stator winding having a wave winding configuration and having a plurality of phases, each phase comprising at least a first filar extending circumferentially around said stator core to form a plurality of layers;
 said first filar being a conductor having a plurality of slot segments disposed in said core slots, said slot segments alternately connected at said first and second ends of said stator core by a plurality of end loop segments,
 said first filar of a particular one of said phases having a first set of a plurality of consecutive slot segments wherein each slot segment is disposed at substantially the same radial distance from a central axis of said stator core, having a second set of a plurality of consecutive slot segments wherein each slot segment is disposed at substantially the same radial distance from a central axis of said stator core, and having a third set of a plurality consecutive slot segments wherein each slot segment is disposed at substantially the same radial distance from a central axis of said stator core;

said plurality of consecutive slot segments of said first set being disposed at substantially the same radial distance from a central axis of said stator core as said plurality of consecutive slot segments of said third set;

said plurality of consecutive slot segments of said second set being disposed at substantially a different radial distance from a central axis of said stator core as said plurality of consecutive slot segments of said first set; and said second set being located in between said first set and said third set.

24. A stator for an electric machine, comprising:
a generally cylindrically-shaped stator core having a plurality of circumferentially spaced and axially-extending core slots in a surface thereof, said core slots extending between a first and a second end of said stator core;
a stator winding having a plurality of phases, each phase comprising at least a first filar extending circumferentially around said stator core to form a plurality of layers;
said first filar being a conductor having a plurality of slot segments disposed in said core slots, said slot segments alternately connected at said first and second ends of said stator core by a plurality of end loop segments;
said first filar of a particular one of said phases having a plurality of consecutive slot segments being disposed in a particular layer and a plurality of consecutive slot segments being disposed in a different particular layer;
a plurality of end loop segments connecting a first slot segment disposed in a first particular core slot with a second slot segment disposed in a second particular core slot, wherein each end loop segment is a same layer end loop segment;
a particular one of said same layer end loop segment connecting said first slot segment disposed in said first particular core slot with said second slot segment disposed in said second particular core slot, includes a portion which is located at a different radial distance from the central axis of said stator core as any portion of said first and said second slot segments; and
at least one of said same layer end loop segment connecting said first slot segment disposed in said first particular core slot with said second slot segment disposed in said second particular core slot, is located on a first end of the stator core and at least one of said same layer end loop segment connecting said first slot segment disposed in said first particular core slot with said second slot segment disposed in said second particular core slot, is located on a second end of the stator core.

25. The stator according to claim 24 wherein said slot segments are aligned in one radial row in at least one core slot.

26. The stator according to claim 24 wherein at least half of said same layer end loop segments connecting said first slot segment disposed in said first particular core slot with said second slot segment disposed in said second particular core slot, include a portion which is located at a different radial distance from the central axis of said stator core as any portion of said first and said second slot segments.

27. The stator according to claim 24 wherein said plurality of same layer end loop segments connected to said first slot segment and said second slot segment and a plurality of end loop segments connected to a slot segment disposed in a core slot located in between said first particular core slot and said second particular core slot, form a cascaded winding pattern.

28. A stator for an electric machine, comprising:
a generally cylindrically-shaped stator core having a plurality of circumferentially spaced and axially-extending core slots in a surface thereof, said core slots extending between a first and a second end of said stator core;
a stator winding having a plurality of phases, each phase comprising at least a first filar extending circumferentially around said stator core to form a plurality of layers;
said first filar being a conductor having a plurality of slot segments disposed in said core slots, said slot segments alternately connected at said first and second ends of said stator core by a plurality of end loop segments;
said first filar of a particular one of said phases having a plurality of consecutive slot segments being disposed in a particular layer and a plurality of consecutive slot segments being disposed in a different particular layer;
a plurality of end loop segments connecting a first slot segment disposed in a first particular core slot with a second slot segment disposed in a second particular core slot, wherein each end loop segment is a same layer end loop segment; and
at least one of said same layer end loop segment connecting said first slot segment disposed in said first particular core slot with said second slot segment disposed in said second particular core slot, includes at least one sloped portion.

29. The stator according to claim 28 wherein a particular one of said same layer end loop segment connecting said first slot segment disposed in said first particular core slot with said second slot segment disposed in said second particular core slot, includes a portion which is located at a different radial distance from the central axis of said stator core as any portion of said first and said second slot segments.

30. The stator according to claim 28 wherein at least one of said same layer end loop segment connecting said first slot segment disposed in said first particular core slot with said second slot segment disposed in said second particular core slot, is located on a first end of the stator core and at least one of said same layer end loop segment connecting said first slot segment disposed in said first particular core slot with said second slot segment disposed in said second particular core slot, is located on a second end of the stator core.

31. The stator according to claim 28 wherein said slot segments are aligned in one radial row in at least one slot.

32. The stator according to claim 28 wherein said plurality of end loop segments connected to said first slot segment and said second slot segment and a plurality of end loop segments connected to a slot segment disposed in a core slot located in between said first particular core slot and said second particular core slot, form a cascaded winding pattern.

* * * * *